United States Patent
Vargas Bautista et al.

(10) Patent No.: US 9,479,955 B2
(45) Date of Patent: Oct. 25, 2016

(54) DYNAMIC MEASUREMENT RATES TO SPEED UP CELL RESELECTIONS

(71) Applicant: QUALCOMM Incorporated, San Diego, CA (US)

(72) Inventors: Jose Edson Vargas Bautista, San Diego, CA (US); Mutaz Zuhier Afif Shukair, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 473 days.

(21) Appl. No.: 13/801,597

(22) Filed: Mar. 13, 2013

(65) Prior Publication Data

US 2013/0258883 A1    Oct. 3, 2013

Related U.S. Application Data

(60) Provisional application No. 61/618,564, filed on Mar. 30, 2012.

(51) Int. Cl.
| | | |
|---|---|---|
| *H04W 24/10* | (2009.01) | |
| *H04W 36/00* | (2009.01) | |
| H04W 36/14 | (2009.01) | |
| H04W 76/04 | (2009.01) | |

(52) U.S. Cl.
CPC ......... *H04W 24/10* (2013.01); *H04W 36/0094* (2013.01); *H04W 36/14* (2013.01); *H04W 76/048* (2013.01)

(58) Field of Classification Search
CPC ... H04W 24/08; H04W 28/20; H04W 24/10; H04W 36/30; H04W 52/0216; H04W 52/02; H04W 28/18; H04W 76/048; H04W 74/08; H04W 48/16; Y02B 60/50; H04B 17/309; H04L 5/0057
See application file for complete search history.

(56) References Cited

U.S. PATENT DOCUMENTS

| | | | |
|---|---|---|---|
| 8,229,434 B2 | 7/2012 | Kazmi et al. | |
| 8,548,456 B1* | 10/2013 | Ben-Eli | H04L 1/20 370/252 |
| 2004/0023634 A1* | 2/2004 | Jeong | H04B 1/7073 455/403 |
| 2008/0170557 A1* | 7/2008 | Yin | H04W 72/005 370/343 |
| 2008/0225744 A1* | 9/2008 | DiGirolamo | H04W 28/18 370/252 |
| 2009/0047958 A1 | 2/2009 | Rimhagen et al. | |
| 2009/0088160 A1* | 4/2009 | Pani | H04W 36/30 455/436 |
| 2009/0181676 A1* | 7/2009 | Lee | H04J 11/0093 455/436 |
| 2009/0296652 A1 | 12/2009 | Rudowicz et al. | |
| 2010/0041412 A1* | 2/2010 | Yu | H04W 24/10 455/450 |
| 2010/0190487 A1* | 7/2010 | Wang | H04W 36/0088 455/423 |
| 2011/0085465 A1* | 4/2011 | Lindoff | H04J 11/0069 370/252 |
| 2012/0015657 A1* | 1/2012 | Comsa | H04W 36/0094 455/436 |
| 2012/0046030 A1* | 2/2012 | Siomina | G01S 5/00 455/423 |
| 2012/0202480 A1 | 8/2012 | Franklin et al. | |

(Continued)

OTHER PUBLICATIONS

International Search Report and Written Opinion—PCT/US2013/031187—ISA/EPO—Jun. 27, 2013.

*Primary Examiner* — Jung-Jen Liu
(74) *Attorney, Agent, or Firm* — Patterson & Sheridan, L.L.P.

(57) ABSTRACT

A method, an apparatus, and a computer program product for wireless communication are provided in which a switch to a second network is facilitated by increasing a rate of measurement of certain quantities of the second network while in an idle state in a first network. The rate of measurement maybe increased to an integer multiple of a frequency associated with a discontinuous reception cycle configured for the first network.

37 Claims, 13 Drawing Sheets

(56) References Cited

U.S. PATENT DOCUMENTS

| | | | |
|---|---|---|---|
| 2012/0252368 A1* | 10/2012 | Edara | H04W 24/10 455/67.11 |
| 2012/0252455 A1 | 10/2012 | Martin et al. | |
| 2012/0252487 A1* | 10/2012 | Siomina | H04W 24/10 455/456.1 |
| 2012/0264449 A1* | 10/2012 | Kazmi | G01S 5/0205 455/456.1 |
| 2013/0017841 A1* | 1/2013 | Kazmi | G01S 5/0236 455/456.1 |
| 2013/0053091 A1* | 2/2013 | Jorguseski | H04W 24/02 455/524 |
| 2013/0064176 A1* | 3/2013 | Hsu | H04W 4/02 370/328 |
| 2013/0079009 A1* | 3/2013 | Aumann | H04W 16/02 455/436 |
| 2013/0148530 A1* | 6/2013 | Di Girolamo | H04L 12/2602 370/252 |
| 2013/0176891 A1* | 7/2013 | Lee | H04W 24/10 370/252 |
| 2013/0194954 A1* | 8/2013 | Dalsgaard | H04W 24/10 370/252 |
| 2013/0196659 A1* | 8/2013 | Damji | H04W 52/0225 455/434 |
| 2013/0258876 A1* | 10/2013 | Damji | H04W 52/0254 370/252 |
| 2013/0279353 A1* | 10/2013 | Ji | H04W 52/0216 370/252 |
| 2014/0112180 A1* | 4/2014 | Axmon | H04W 24/10 370/252 |
| 2014/0119334 A1* | 5/2014 | Kazmi | H04L 5/0032 370/330 |
| 2014/0198680 A1* | 7/2014 | Siomina | H04L 5/14 370/252 |
| 2014/0200016 A1* | 7/2014 | Siomina | H04W 24/08 455/450 |
| 2014/0206355 A1* | 7/2014 | Pani | H04W 36/30 455/436 |
| 2015/0119039 A1* | 4/2015 | Virtej | H04W 24/10 455/436 |
| 2015/0282076 A1* | 10/2015 | Larmo | H04W 52/0209 370/311 |

* cited by examiner

DYNAMIC MEASUREMENT RATES TO SPEED UP CELL RESELECTIONS

CLAIM OF PRIORITY UNDER 35 U.S.C. §119

The present Application for patent claims priority to U.S. Provisional Application No. 61/618,564, filed Mar. 30, 2012, and assigned to the assignee hereof and hereby expressly incorporated by reference herein.

FIELD

The present disclosure relates generally to communication systems, and more particularly, to communication systems that use multiple radio technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Aspects of the present disclosure provide a method of wireless communication performed by a user equipment (UE). The method generally includes, while connected to a first radio access technology (RAT) network, entering a state in which measurements are performed in a second RAT network, selectively increasing a rate of measurements performed in the second RAT network when at least a first condition is met, and selectively reducing the rate of measurements performed in the second RAT network when at least a second condition is met.

Aspects of the present disclosure provide an apparatus for wireless communication by a user equipment (UE). The apparatus generally includes means for entering a state in which measurements are performed in a second radio access technology (RAT) network while connected to a first RAT network, means for selectively increasing a rate of measurements performed in the second RAT network when at least a first condition is met, and means for reducing the rate of measurements performed in the second RAT network when at least a second condition is met.

Aspects of the present disclosure provide an apparatus for wireless communication by a user equipment (UE). The apparatus generally includes at least one processor configured to enter a state in which measurements are performed in a second radio access technology (RAT) network while connected to a first RAT network, selectively increase a rate of measurements performed in the second RAT network when at least a first condition is met, and selectively reduce the rate of measurements performed in the second RAT network when at least a second condition is met; and a memory coupled with the at least one processor.

Aspects of the present disclosure provide a computer program product for wireless communication by a user equipment (UE) comprising a non-transitory computer-readable medium having instructions stored thereon. The instructions are generally executable for, while connected to a first radio access technology (RAT) network, entering a state in which measurements are performed in a second RAT network, selectively increasing a rate of measurements performed in the second RAT network when at least a first condition is met, and selectively reducing the rate of measurements performed in the second RAT network when at least a second condition is met.

BRIEF DESCRIPTION OF THE DRAWINGS

FIG. 10A illustrates example operations for changing measurement rate based on detecting presence of a network to be measured, in accordance with aspects of the present disclosure.

DETAILED DESCRIPTION

Figure 1:
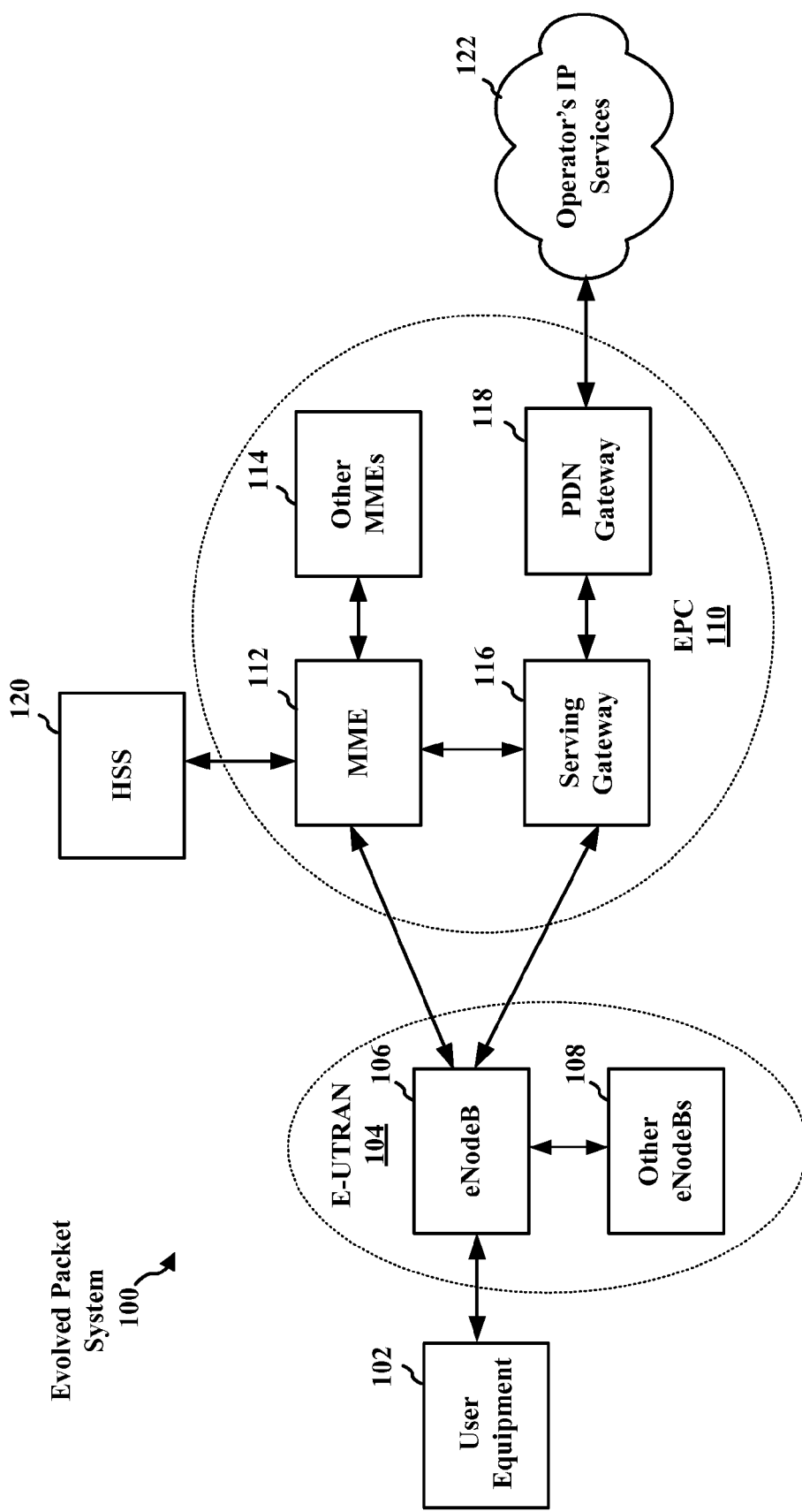
FIG. 1 illustrates an example network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a packet switched (PS) Streaming Service (PSS).

Figure 2:
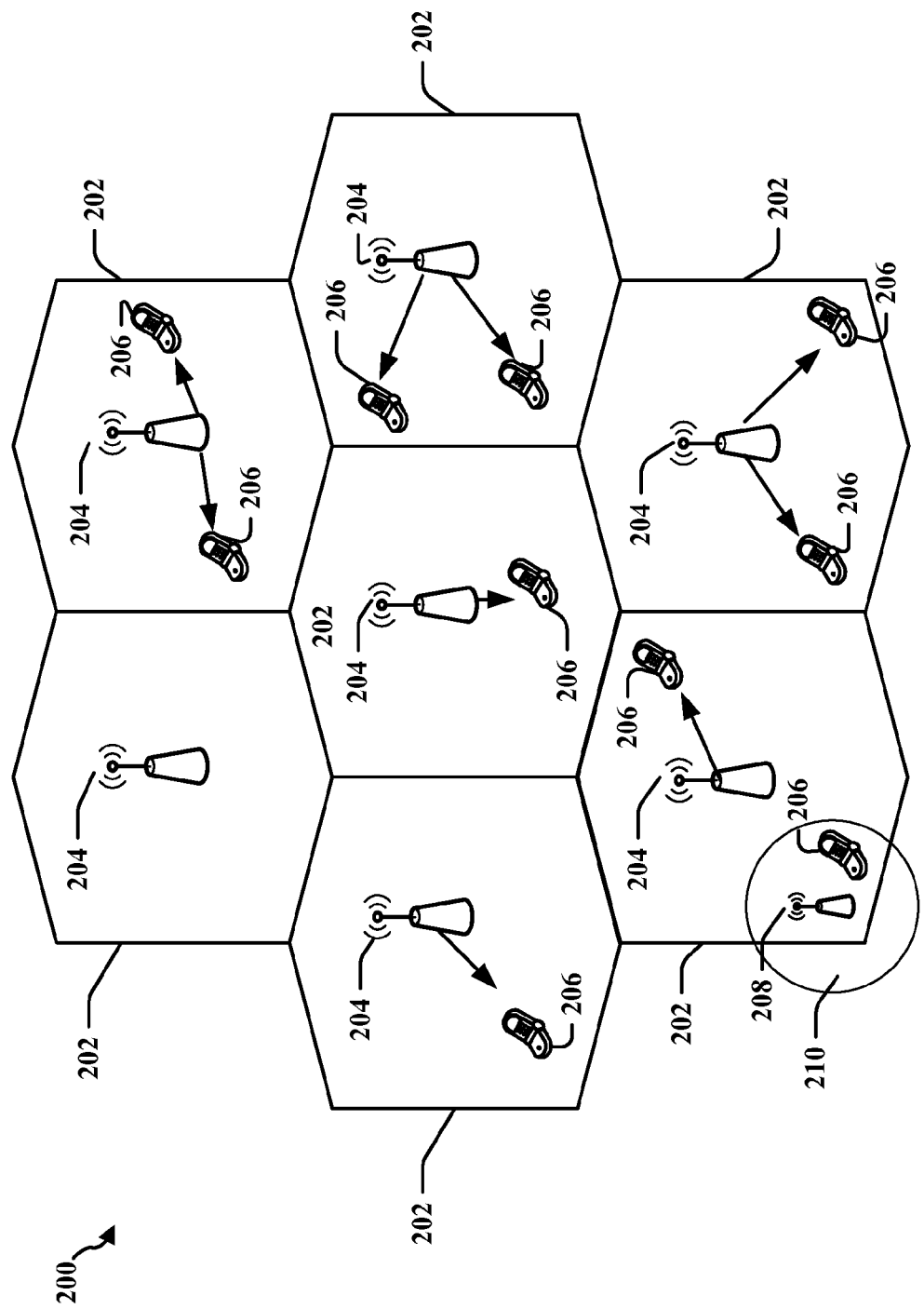
FIG. 2 illustrates an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
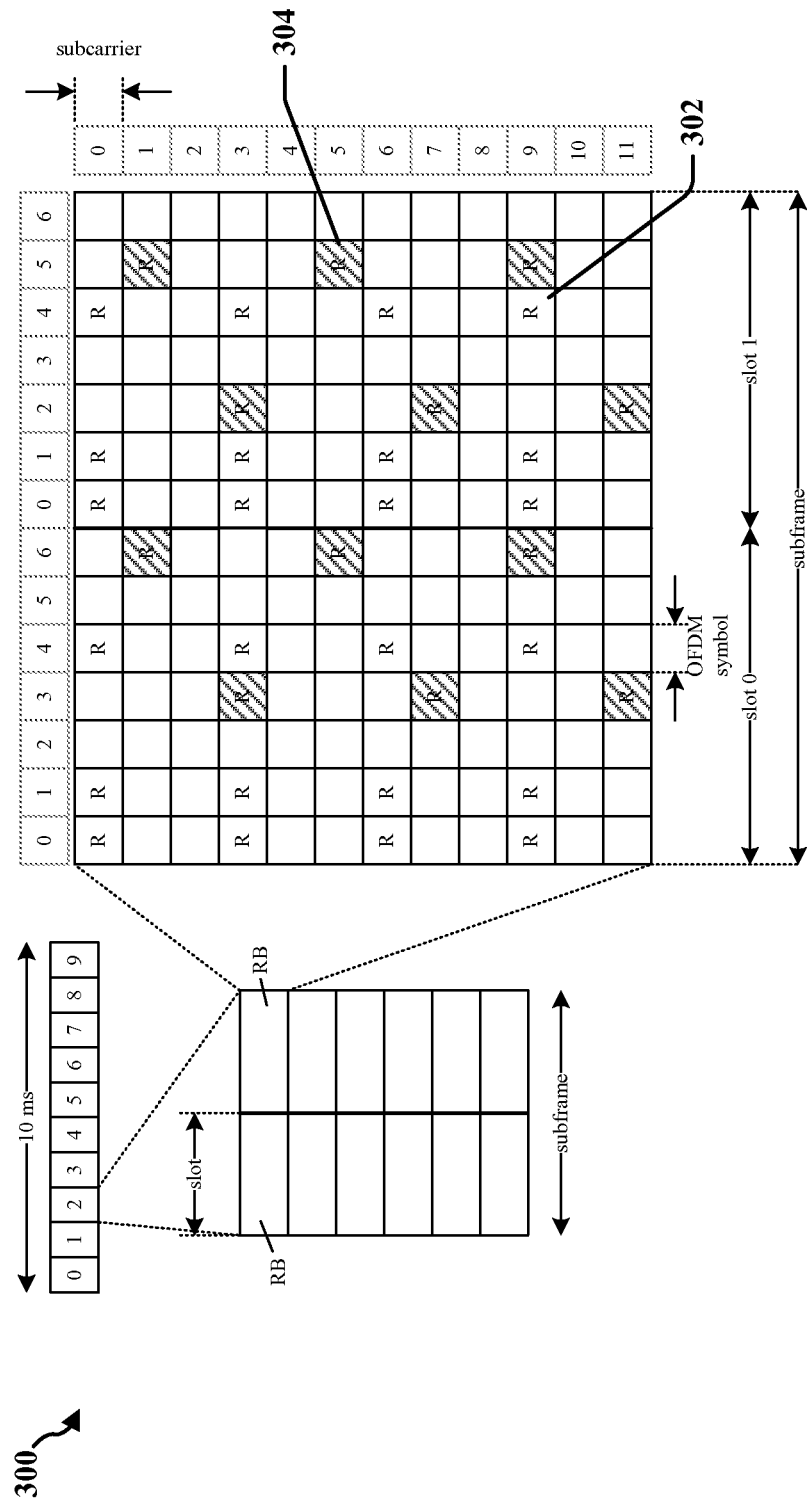
FIG. 3 illustrates an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
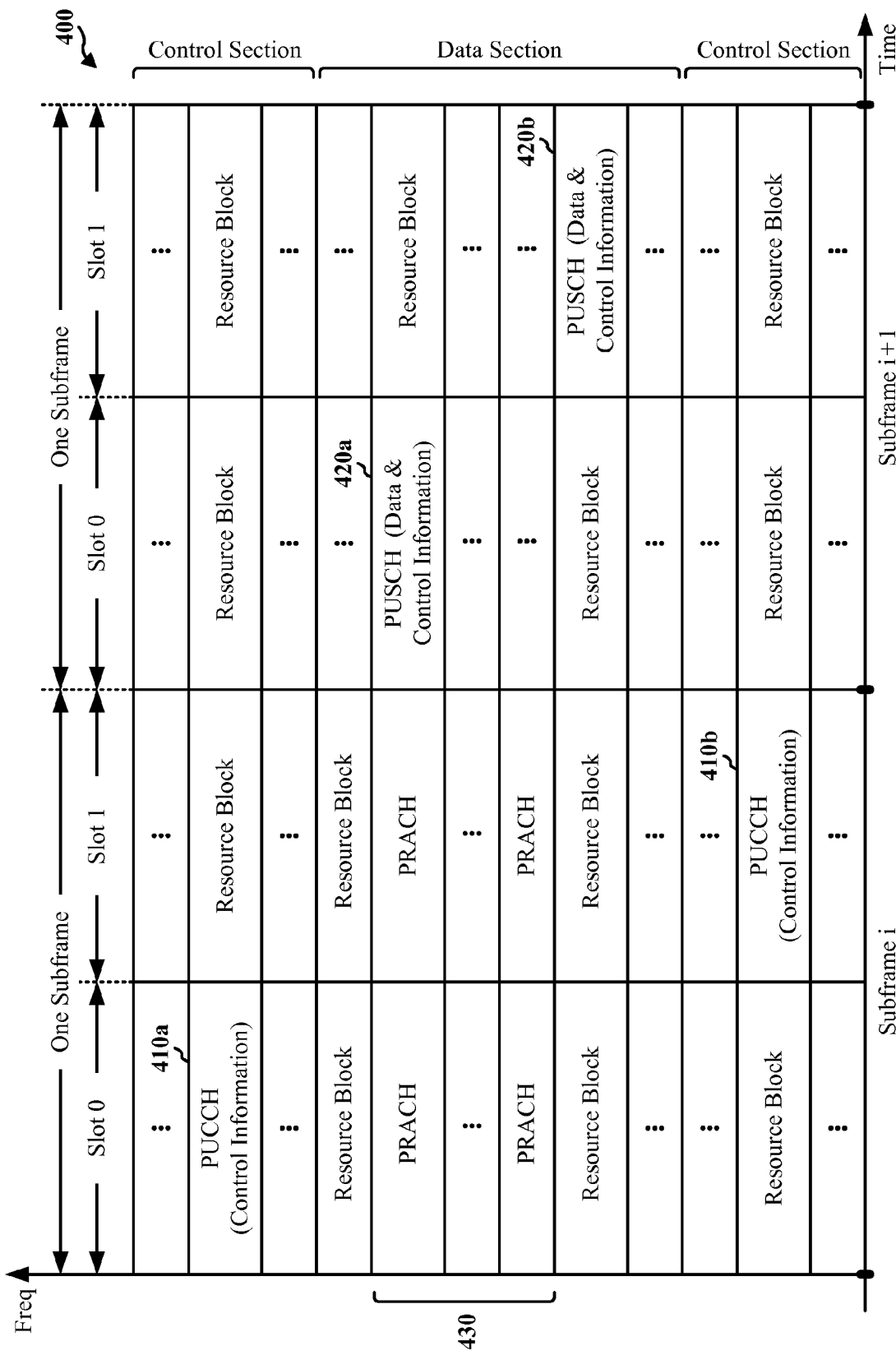
FIG. 4 illustrates an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
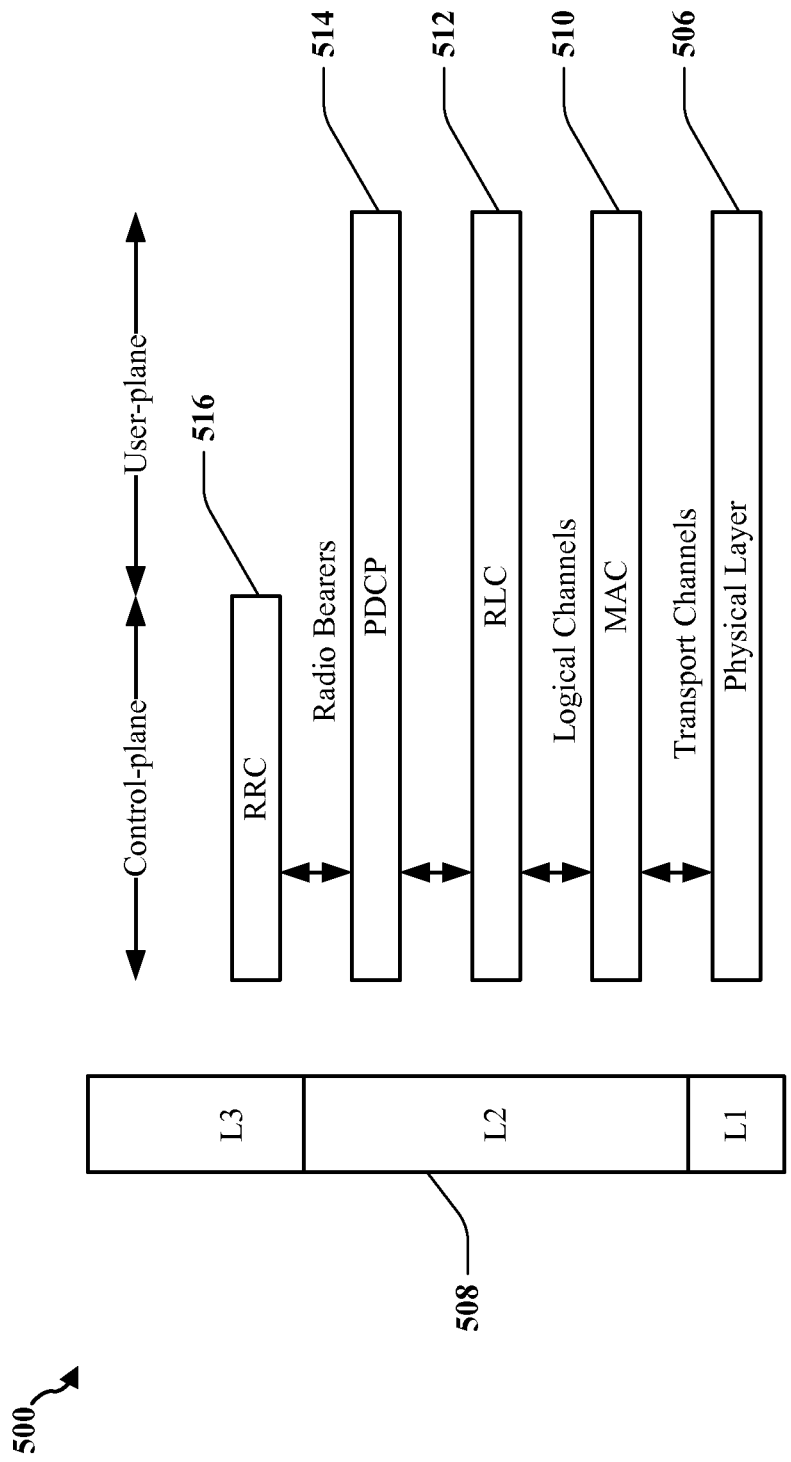
FIG. 5 illustrates an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
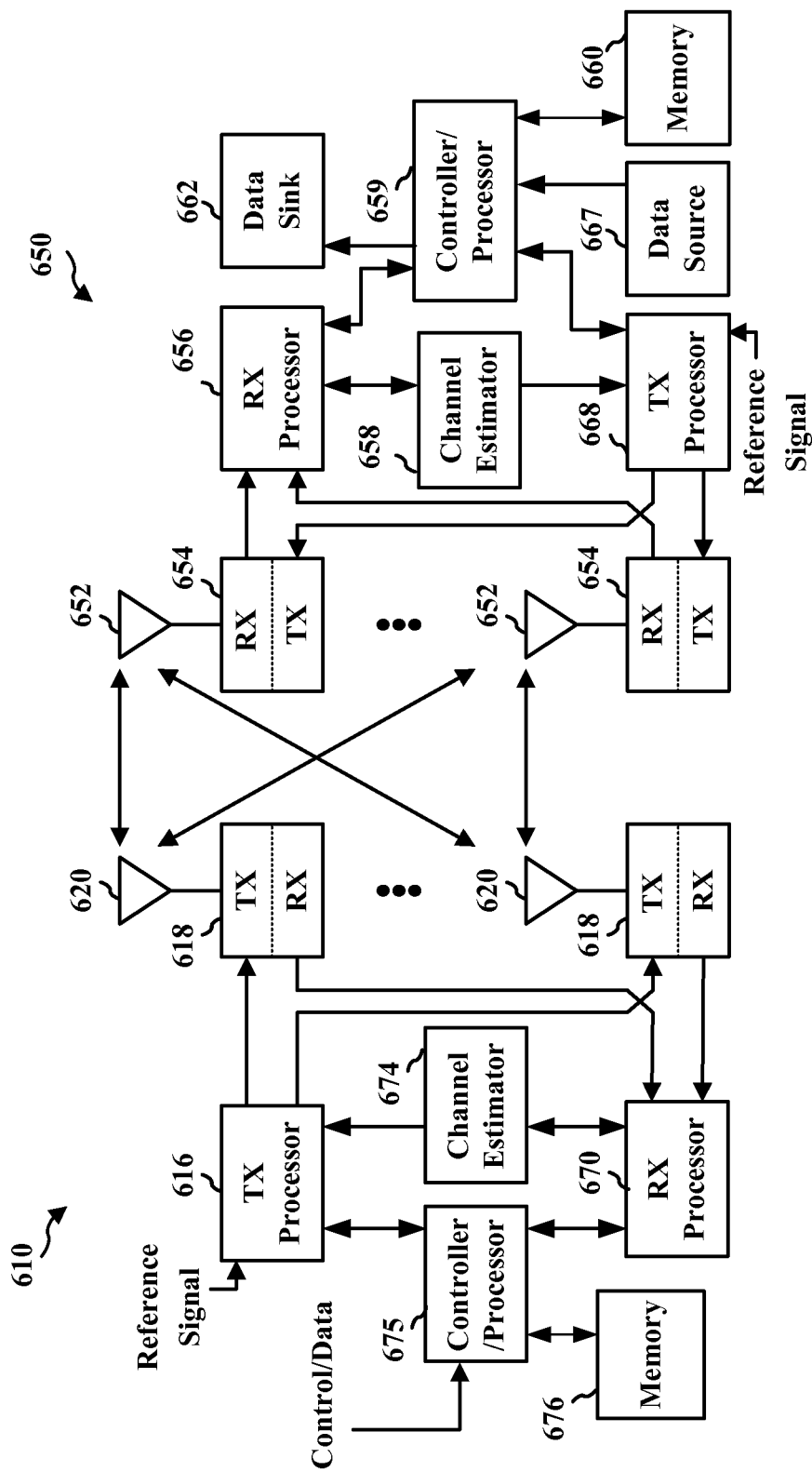
FIG. 6 illustrates an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Referring again to FIG. 2, UE 206 may be located within the coverage of multiple cells 202 and these cells 202 may use different frequencies and/or different RATs. When idle, UE 206 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may be used for W-CDMA and may have medium priority. In general, the priority list may include any number of frequencies for any set of RATs and may be specific for the UE location. UE 206 may be configured to prefer LTE, when available, by defining the priority list with LTE frequencies at the highest priority and with frequencies for other RATs at lower priorities.

In idle mode, UE 206 may identify all frequencies and/or RATs on which it is able to find a suitable cell for normal LTE operation. UE 206 may camp on the RAT with the highest priority among all identified RATs and UE 206 may remain on this RAT until the RAT becomes unavailable, or until a higher priority RAT becomes available. The behavior of UE 206 in idle mode may conform or be consistent with operations specified in the publicly available "Evolved Universal Terrestrial Radio Access (E-UTRA); User Equipment (UE) procedures in idle mode," publication (3GPP TS 36.304).

UE 206 may be able to receive packet-switched (PS) data services from an LTE network and may camp on the LTE network while in the idle mode. If the LTE network does not adequately support voice-over-Internet protocol (VoIP), UE 206 may be transferred to another wireless network of another radio access technology (RAT) to initiate or receive voice calls. This transfer may be referred to as circuit-switched (CS) fallback and may be accomplished by inter-RAT (IRAT) redirection or handover executed by UE 206. For example, UE 206 may reselect a RAT that supports voice service, such as 1xRTT, W-CDMA, GSM, or other RAT. UE 206 may transfer from an LTE network to another RAT if LTE service is lost, particularly when UE 206 physically moves through a coverage area of a communication system. The gap in service may be referred to as a network coverage hole, or in the specific example of LTE, an LTE hole.

Certain embodiments of the invention provide systems and methods that may help accelerate RAT reselections. UE 206 may be configurable to select between available cells operating using different RATs. For example, UE 206 may be operable in W-CDMA and LTE systems, and LTE may be designated as a higher priority RAT. When the UE 206 is camped on a lower priority network, the UE 206 may attempt to reselect the higher-priority network when it becomes available. While UE 206 is camped in the lower-priority RAT, UE 206 continues to evaluate whether to switch between RATs according to reselection criteria.

Figure 7:
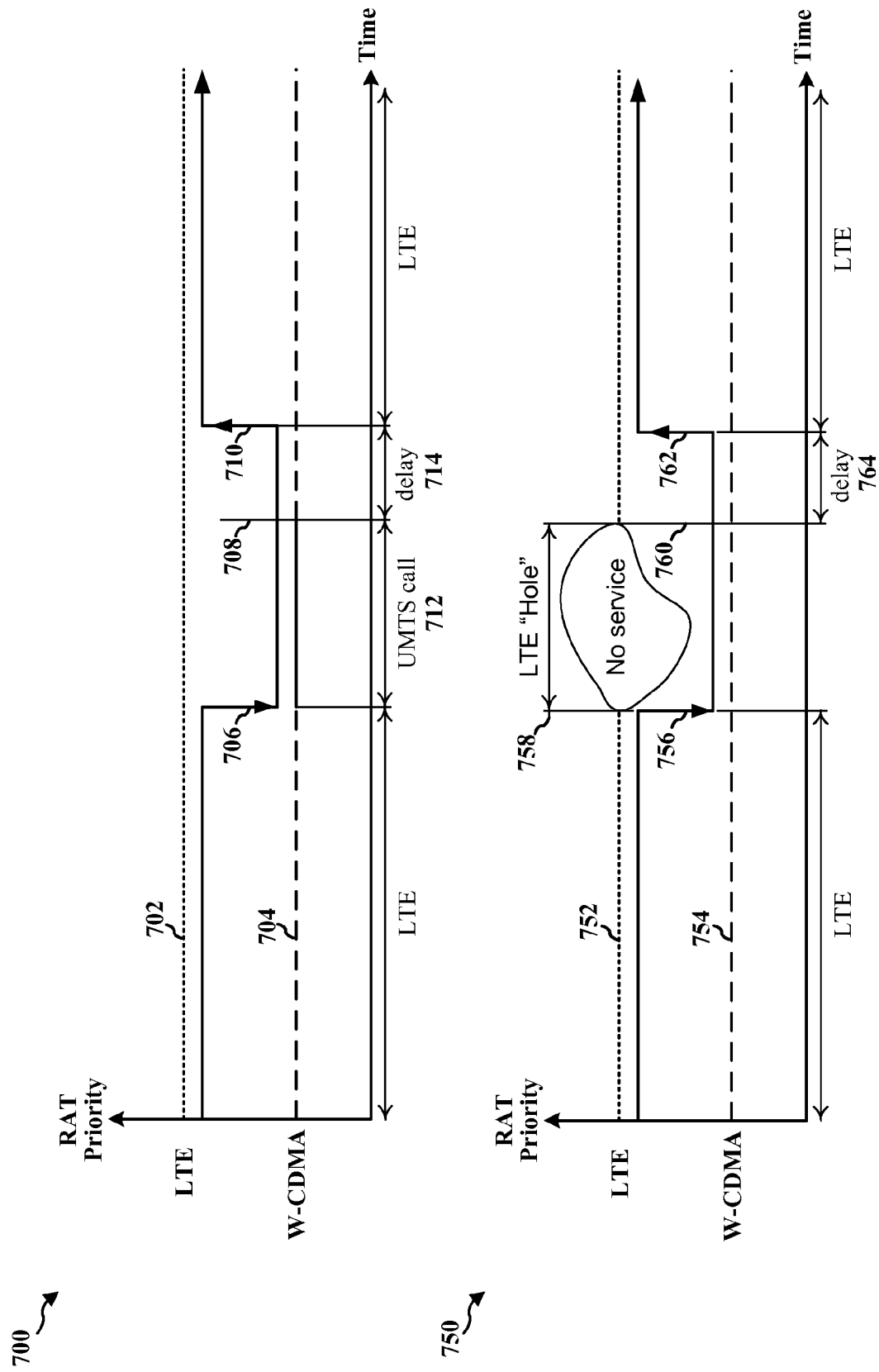
FIGS. 7-9 illustrate example timelines for measurements for cell reselection.

Certain embodiments enable UE 206 to more return quickly to a high-priority RAT when UE 206 is in an IDLE state in a lower-priority RAT. FIG. 7 includes simplified timing diagrams 700 and 750 illustrating RAT reselection. Timing chart 700 relates to a UE 206 that can select between an available LTE connection 702 and a lower priority W-CDMA connection 704, where the LTE connection 702 is assigned a higher priority than the W-CDMA connection 704. Priority may be communicated to UE 206 by eNB 204 using, for example, a system information block (SIB). SIBs may convey information to UE 206 that defines a paging channel (PCH) to be monitored by UE 206 when UE 206 is in an IDLE state (sleep mode), frequency of a discontinuous reception (DRX) cycle used to determine when IRAT measurements are to be made and other information.

Paging is used by a network to notify (page) UE 206 of an incoming call, changes in configuration information, for example. Certain pages can be sent to UE 206 when in connected mode, which may be referred to as DCH/CELL-FACH mode. UE 206 may receive certain types of pages while in idle or connected mode (PCH/CELL-PCH). In idle mode, the UE 206 may be configured to "wake up" periodically in order to receive pages at predefined intervals of time.

Periodic IRAT measurements of signal strengths may be taken by UE 206. IRAT measurements may relate to one or more quantities, including a reference symbol received power (RSRP), a carrier received signal strength indicator (RSSI), and/or a reference signal received quality (RSRQ). IRAT measurements may be evaluated to determine if one or more measured quantities exceed a threshold. In some aspects, the threshold may be used to determine if a handover from a low-priority RAT to a high-priority RAT can be accomplished. The eNB 204 may determine a rate at which IRAT measurements are to be performed by UE 206, where the frequency of measurements is selected to permit UE 206 to quickly switch between RATs while conserving battery life of UE 206.

As shown generally at 700, UE 206 may camp in the higher-priority RAT 702 except when a call 712 is to be established using the lower-priority RAT 704. UE 206 may select the lower-priority RAT 704 at time 706 in order to establish the call, which may last for a period of time 712. The UE 206 may then reselect the higher-priority RAT 702 at some point in time 710 after call termination 708 when the UE 206 becomes idle on lower-priority RAT 704. The delay 714 between call termination 708 and reselection 710 of higher-priority RAT 702 may be affected by the rate of IRAT measurement, which may be determined by network configuration and UE 206 processing capabilities.

As shown generally at 750, UE 206 may be camped in IDLE state in the lower-priority RAT 754, because of an LTE Hole 758, commencing at time 756 and typically caused by geographic unavailability or other disruption of high-priority service 752. When high-priority service 752 becomes available at 760, UE 206 may attempt to reselect the high-priority service 752 at the earliest opportunity 762. The delay 764 between service availability 760 and reselection 762 of high-priority RAT 752 may be affected by the rate of IRAT measurement, which may be determined by network configuration and UE 206 processing capabilities.

In a wireless network cell, one or more PCHs may be established and each secondary common control physical channel (SCCPCH) indicated to the UE 206 in system information may carry a PCH. As described herein, UE 206 may be moved from an IDLE state in a W-CDMA network to an LTE network more quickly than can be accomplished through conventional approaches based on timing defined by static, or semi-static DRX configurations broadcast by a serving W-CDMA NodeB 204 in one or more SIBs. In the examples described in FIG. 7, an LTE capable UE 206, when camped in IDLE state in a W-CDMA system typically attempts to move UE 206 back to the LTE system as soon as possible when the LTE system has a higher defined priority than the serving W-CDMA system, if a suitable LTE cell is available. Suitability of a cell may be specified by standards bodies and defined in terms of detected radio conditions.

In conventional systems, a statically defined rate of IRAT measurements is related to the DRX settings when UE 206 is in an IDLE state on a W-CDMA network. For example, the rate of IRAT measurements applicable to W-CDMA to LTE IRAT cell reselection is provided by parameters broadcast on SIB 19 and SIB 3 by the W-CDMA serving cell. The information in the SIBs is generally intended to apply to multiple UEs 206 in the cell. Conflicts can arise with regard to tradeoff decisions between call setup, UE 206 battery life, and IRAT cell reselection performance. A shorter DRX cycle setting can impact battery life as the UE 206 wakes up more frequently to monitor paging. A longer DRX cycle setting improves UE 206 battery life, but can result in poor mobile terminated (MT) call setup delays. The tradeoff selected by operators typically accommodates a wide range of UE 206 capabilities and can result in less than ideal trade-offs for individual UEs 206.

In some embodiments, an increased rate of measurement may be provided without altering the period of the system DRX cycle, thereby decreasing or eliminating the impact of DRX-related trade-offs on IRAT reselection processes. UE 206 may change its IRAT measurement rate (frequency) autonomously to a maximum rate when it is intended that UE 206 is moved from the lower priority serving RAT to the higher priority RAT at the earliest possible time. Typically, the IRAT measurement rate is increased when a higher priority RAT or frequency is detected.

In some cases, the measurement rate may be changed based on how likely it is the UE will find a measured network. For example, measurement rate may be increased when measurements (e.g. reference symbol received power, carrier received signal strength indicator, reference signal received quality) of a higher priority RAT exceed a threshold value. The IRAT measurement rate may also be increased when measurements of a lower priority RAT fall below a predefined threshold. Other conditions, such as battery power of the UE, the time of day, or network load of either the higher or lower priority RAT may influence the determination to increase the IRAT measurement rate.

In some cases, a change in measurement rate may be made independently of the paging monitoring rate defined for the DRX cycle. The UE 206 continues to monitor paging occasions defined by the lower priority serving RAT when the IRAT measurement rate is increased in order to avoid missing pages. Increases in the IRAT measurement rate may be limited to short periods of time to preserve battery life, or other resources.

Systems and methods disclosed herein can speed up IRAT cell reselection without significantly affecting UE 206 battery life and/or MT call setup performance of other UEs 206 served by the lower priority RAT. Certain of the disclosed systems and methods may be implemented transparently with respect to serving RATs and maintain monitoring of the paging occasions by UE 206 as defined by a current lower priority RAT. In particular, the UE 206 may be configured to perform additional measurements without missing pages in the lower priority serving RAT.

Figure 8:
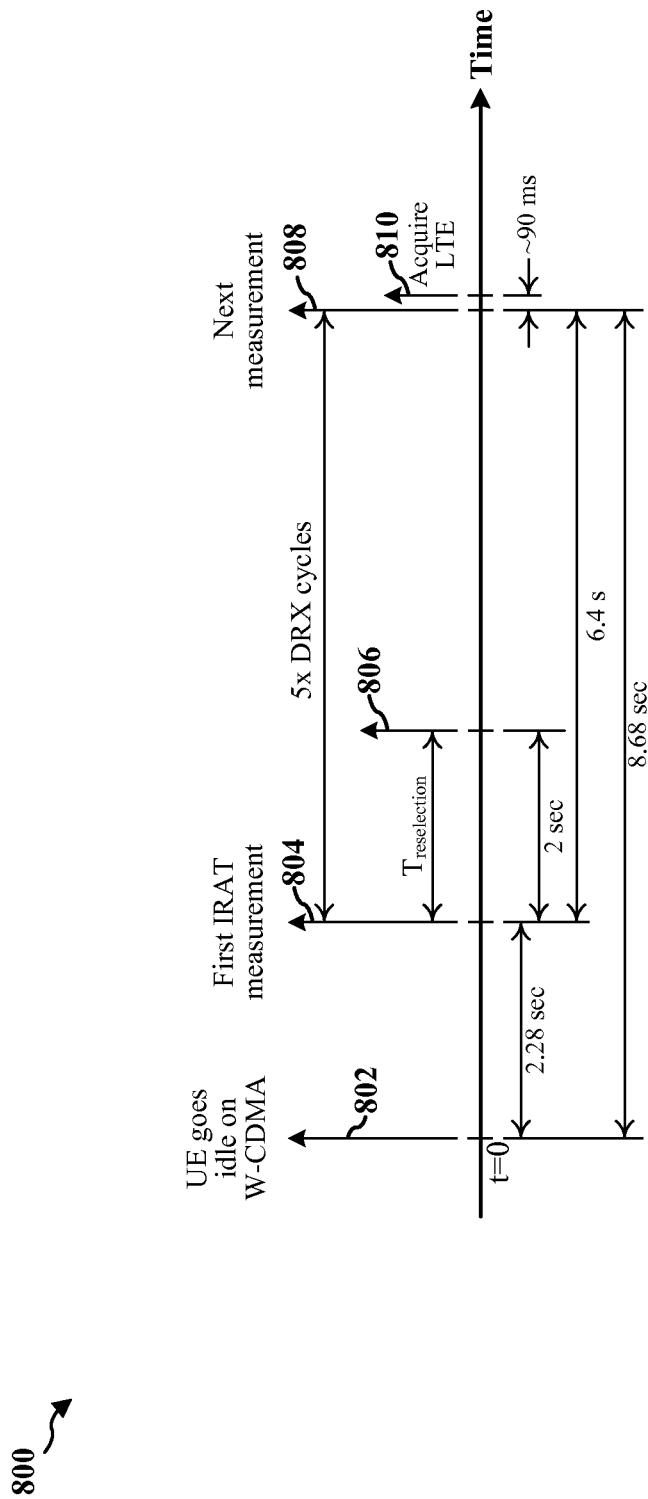

FIG. 8 is a timing chart 800 depicting the timing of a reselection process using measurements taken based only on DRX timing. DRX timing is defined by a SIB (e.g. SIB 1) such that a DRX cycle length and a DRX measurement period are configured. In the example depicted, DRX period is 1.28 seconds and measurements may be specified as a number of DRX cycles, which may be 5 cycles for a 1.28 ms cycle length. DRX-based reselection may begin when UE 206 transitions from DCH/Cell-FACH to an IDLE state, or after the UE 206 has completed an IRAT LTE to WCDMA cell reselection. The IDLE state begins at time 802 (t=0) and the first measurement is made after one DRX period. The UE 206 may be required to remain in a RAT for a predefined minimum period of time, which may be one second. Thus, the first measurement in the example is taken at time 804 which can occur up to 2.28 seconds after entry into IDLE state at time 802.

When UE 206 determines from the first measurement at time 804 that an LTE RAT is available, UE 206 may initiate a reselection timer that expires at time 806. The UE 206 typically cannot reselect the LTE RAT until the reselection timer expires. In the example, the reselection timer $T_{reselection}$ has a duration of 2 seconds. The W-CDMA cell typically defines a number of DRX cycles between IRAT measurements; in the example, the number of DRX cycles is 5. Therefore, the time between first measurement 804 and second measurement 808 is 6.4 seconds. Acquisition of the higher-priority LTE RAT may occur at time 810, approximately 90 milliseconds after time 808. In the example, the total time between entering IDLE state at time 802 and beginning reselection at time 808 can be 8.68 seconds. Table 1 provides examples of DRX related parameters configured by a serving cell.

TABLE 1

| DRX cycle length [s] | $T_{detectE-UTRA}$ [s] | $T_{measureE-UTRA}$ [s] (number of DRX cycles) | $T_{evaluateEUTRA}$ [s] (number of DRX cycles) |
|---|---|---|---|
| 0.08 | 30 | 2.56 (32) | 7.68 (96) |
| 0.16 |    | 2.56 (16) | 7.68 (48) |
| 0.32 |    | 5.12 (16) | 15.36 (48) |
| 0.64 |    | 5.12 (8)  | 15.36 (24) |
| 1.28 |    | 6.4 (5)   | 19.2 (15) |
| 2.56 | 60 | 7.68 (3)  | 23.04 (9) |
| 5.12 |    | 10.24 (2) | 30.72 (6) |

Some embodiments minimize the delay between expiration of an IRAT reselection timer and UE 206 reselection of a higher priority RAT by enabling UE 206 to autonomously increase the rate of IRAT measurements. UE 206 may increase the rate of measurements after a first measurement indicates the presence of a higher-priority RAT. UE 206 may set the increased rate of measurement independently of the DRX configuration set by a network operator for the serving cell.

Dynamic reconfiguration by UE 206 of a rate of IRAT measurement may enable more efficient, faster IRAT cell reselection from a lower priority RAT to a higher priority RAT. As illustrated in the timing chart 900 of FIG. 9, the rate of measurement may be increased to an integer multiple of the DRX cycle frequency. The use of an integer multiplier may enable the UE 206 to avoid missing pages. In the example chart 900, the rate of measurement is increased by a factor of 5, providing 4 measurement intervals between DRX events 902, 904. UE 206 is required to wake up for each DRX event 902 and 904, which coincide with the measurement events associated with the increased measurement rate. In some embodiments, the underlying rate of DRX-based measurements is used as the minimum IRAT measurement rate. In one example, the UE 206 may set an increased rate of measurement equal to the DRX cycle frequency which, by DRX configuration, is an integer multiple of DRX measurement rate. Timing chart 900 illustrates the specific example when the DRX cycle period is 1.28 seconds and the DRX measurement rate is calculated as 5 DRX cycles. Hence, each increased measurement event 906 corresponds to a DRX event, with DRX measurement events 902 and 904.

The integer multiple by which UE 206 increases the rate of IRAT measurement may be selected to obtain a maximum rate of measurements R, which may be determined based on UE 206 processing capability. UE 206 may also determine the rate of IRAT measurements based on the time period between successive DRX measurement events 902 and 904. For example, a time period between measurements may be calculated as an integer fraction of the time between DRX measurement events 902 and 904, where the fraction takes the form of $\frac{1}{2}^n$.

Figure 9:
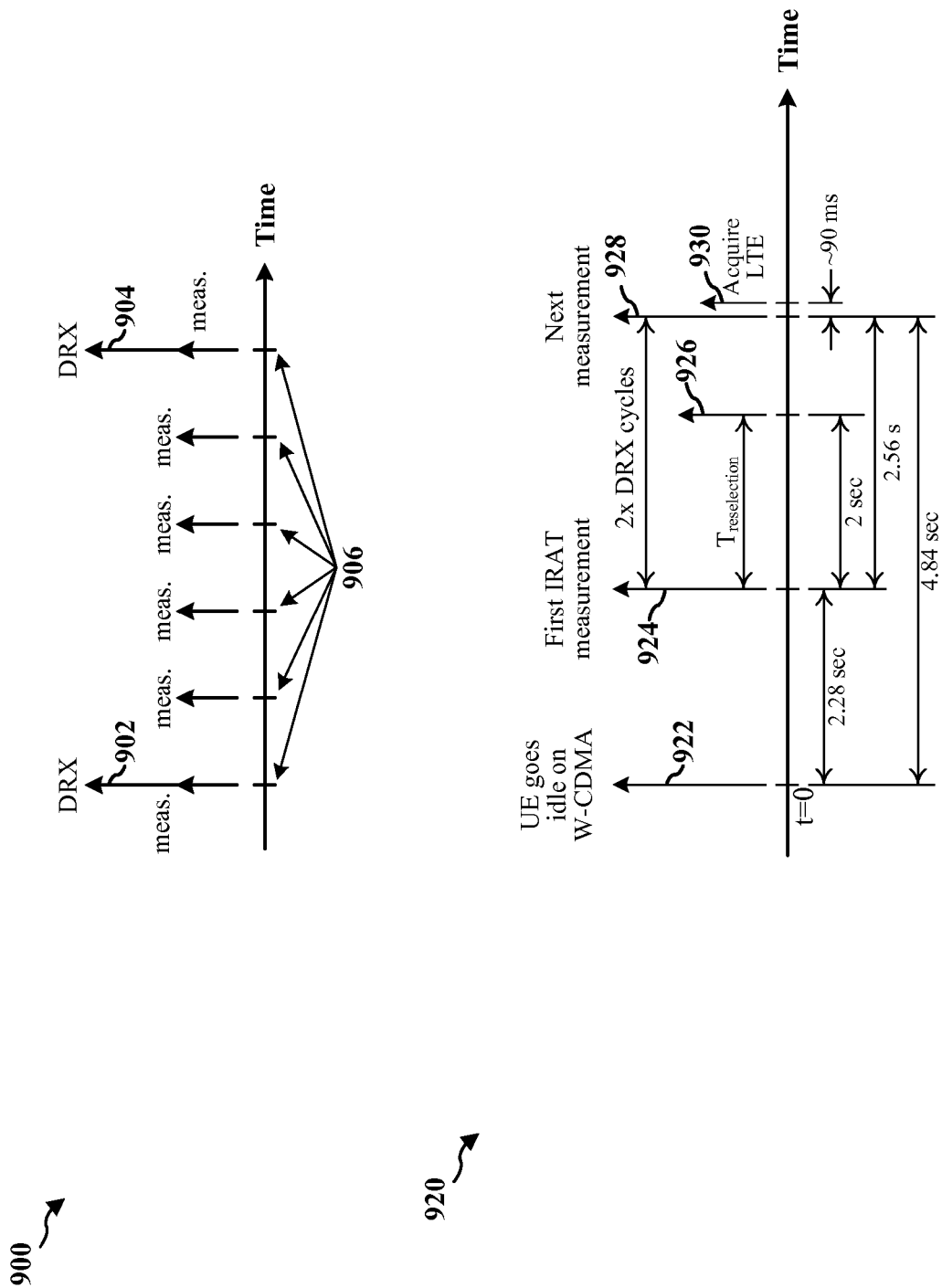

The timing chart 920 in FIG. 9 illustrates the timing of a reselection process using an increased measurement rate. Reselection attempts may begin when UE 206 transitions from DCH/Cell-FACH to an IDLE state, or after UE 206 has completed an IRAT LTE to WCDMA cell reselection. The IDLE state begins at time 922 (t=0), and the first measurement may be taken one DRX period after a predefined minimum time during which UE 206 is required to remain in the low-priority RAT. In some networks, the minimum time is defined by standards as one second, and the first measurement is taken at time 924, which can occur up to 2.28 seconds after entry into IDLE state at time 922. UE 206 may autonomously change its target IRAT cell measurement rate to the highest allowed measurement rate upon entry into the IDLE state in the low-priority RAT. If no suitable reselection cell candidate is found, UE 206 may dynamically reduce (decrease) the IRAT measurement rate to the corresponding DRX measurement rate. In one example, the DRX measurement rate is a fraction of the DRX cycle frequency and the maximum measurement rate may be set equal to the DRX cycle frequency.

In some embodiments, UE 206 may autonomously change its target IRAT cell measurement rate to the highest allowed rate upon detection of a suitable high-priority RAT (at time 924 for example). The effects of dynamic measurement rate reconfigurations by UE 206 may include a reduction in the time spent in IDLE in W-CDMA after a suitable cell is detected in LTE. In some embodiments, UE 206 may wait a certain number of DRX periods in order to allow the reselection timer to expire at time 926, before measuring the target LTE cell. When a suitable LTE cell is discovered after measurement at time 928, LTE acquisition can be accomplished by time 930.

As discussed herein, the higher rate of IRAT measurements may be selected to be an integer multiple of a corresponding paging monitoring wake up periodicity defined by in a DRX configuration. When such integer multiplier is used, the UE 206 does not miss pages because DRX wakeup events 902 and 904 correspond with IRAT measurement events 906. The reduction in IRAT time measurement granularity enables the UE 206 to reselect more closely to the end of $T_{reselection}$ at time 926.

In the examples depicted in FIGS. 8 and 9, the time intervals used to measure ($T_{measureE\text{-}UTRA}$) and evaluate ($T_{evaluate\_EUTRA}$) the target RAT are multiples of 1.28 seconds for all possible DRX cycle settings. In some embodiments, minimum measurement period can be selected based on UE 206 processing capabilities. In the illustrated examples, the minimum measurement time granularity may be set to 1.28 sec or 0.64 seconds (1.28/2), and so on. Smaller IRAT measurement intervals can result in improved IRAT cell reselection performance and UE 206 may wake up and measure multiple times before the occurrence of a paging occasion or measure interval defined by DRX settings.

In certain embodiments, measurement frequency is reset to a minimum measurement frequency when a suitable cell is determined not to be available. The minimum measurement frequency may be the measurement rate defined by the DRX period and number of DRX periods specified between measurements. UE 206 may adjust the measurement frequency between maximum and minimum values. For example, upon detection of an LTE cell, UE 206 may increase the measurement frequency to at least double the minimum measurement frequency and, if no suitable LTE cell is found in subsequent measurements, the UE 206 may reset the measurement frequency to the minimum rate. The UE 206 may determine that no suitable LTE cell is available when one or more quantities or radio conditions fail to meet a threshold value. Quantities and radio conditions may include quantities RSRP, RSSI, RSRQ and other quantities. The UE may determine a measured service quality from the measured quantities. UE 206 may perform a minimum number of measurements before determining that no suitable LTE cell is available. UE 206 may perform measurements until a predefined or preconfigured number of measurements yield no suitable LTE cells.

The decision to reduce (decrease) measurement frequency may be based on other statistical analysis and predefined or configurable parameters. For example, the UE 206 may decide to reduce the measurement rate based on the available battery power in the UE, the time of day, network loading of the network cells, or receiving a call.

UE 206 may incrementally decrease the measurement frequency from a maximum value. When the frequency of measurement is increased by an integer multiple n, UE 206 may successively decrease the frequency of measurement to n−1 until the minimum rate is reached, whereby UE 206 performs a number of measurements at each frequency of measurement before decreasing the frequency of measurement.

The method by which frequency of measurement is reduced toward the minimum frequency of measurement may be based on processing capabilities of UE 206 and the method may be selected to preserve battery life of UE 206. As noted elsewhere herein, a network operator may optimize DRX cycle settings to obtain a desired tradeoff between UE 206 battery life and MT call set up time for all UEs 206 in the cell. However, certain aspects of the presently disclosed systems and methods may circumvent DRX-based optimizations and a UE 206 that dynamically and autonomously modifies frequency of measurement typically optimizes and balances IRAT priority-based cell reselection performance with battery life.

Certain embodiments enable UEs 206 to return as soon as possible to a preferred service using LTE systems. Rapid return may be enabled for a UE 206 that completes a circuit switched fallback (CSFB) call in W-CDMA, and/or completes a PS data session before transitioning to W-CDMA IDLE state. In some embodiments, the probability that a UE 206 enters a connected state in lower priority RAT (W-CDMA) may be reduced because the time spent by the UE 206 in W-CDMA IDLE state is minimized.

Figure 10:
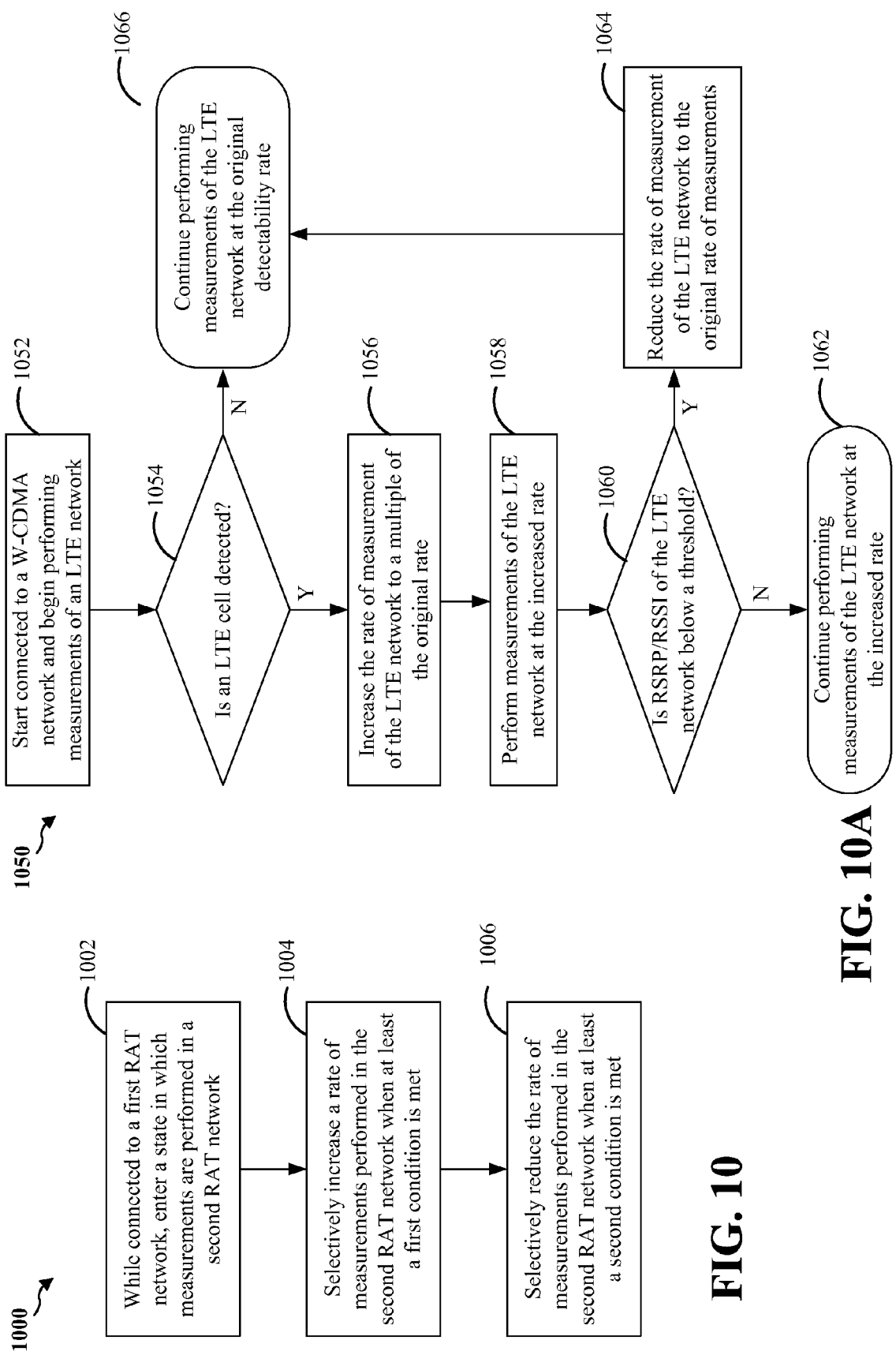
FIG. 10 illustrates example operations for wireless communication, in accordance with aspects of the present disclosure.

FIG. 10 illustrates example operations 1000 for wireless communication. The method may be performed, for example, by a UE 206.

The operations begin, at 1002, with the UE, while connected to a first radio access technology (RAT) network, entering a state in which measurements are performed in a second RAT network. At 1004, the UE selectively increases a rate of measurements performed in the second RAT network when at least a first condition is met. At 1006, the UE selectively reduces the rate of measurements performed in the second RAT network when at least a second condition is met.

FIG. 10A illustrates example operations 1050 for changing a rate of measurement based on detected presence of the network to be measured, with a specific example of LTE and W-CDMA networks.

The operations 1050 begin, at 1052, with the UE connected to the W-CDMA network and beginning to perform measurements in the LTE network.

At step 1054, the UE determines whether it was able to detect an LTE cell, it could have been that the received signal strength indicator (RSSI) or the Reference Signal Received Power (RSRP) of the LTE network is above a threshold. If this condition is met, then, at step 1056 the UE selectively increases the rate of measurements of the LTE network, for example, to twice the original or the maximum possible rate of measurement.

At step 1058, the UE measures the LTE network at the increased rate. For example, the UE may measure one or more of RSRP, RSSI, and RSRQ for the LTE network at twice the original rate of measurement.

At step 1060, the UE may determine if the reference signal received quality (RSRQ) of the LTE network is below a predefined threshold. If not, then the UE may continue performing measurements in the LTE network at the increased rate at step 1062. For example, the UE may continue measuring RSRP, RSSI, and RSRQ of the LTE network at twice the original rate.

If the RSRP, RSRQ, or RSSI is below the threshold, the UE may autonomously reduce the rate of measurement of the LTE network, at step 1064. For example, the UE 206 may reduce the rate of measurement of the LTE network to the original rate of measurement.

After reducing the rate of measurement, the UE may continue performing measurements in the LTE network at the original rate at step 1066.

Figure 11:
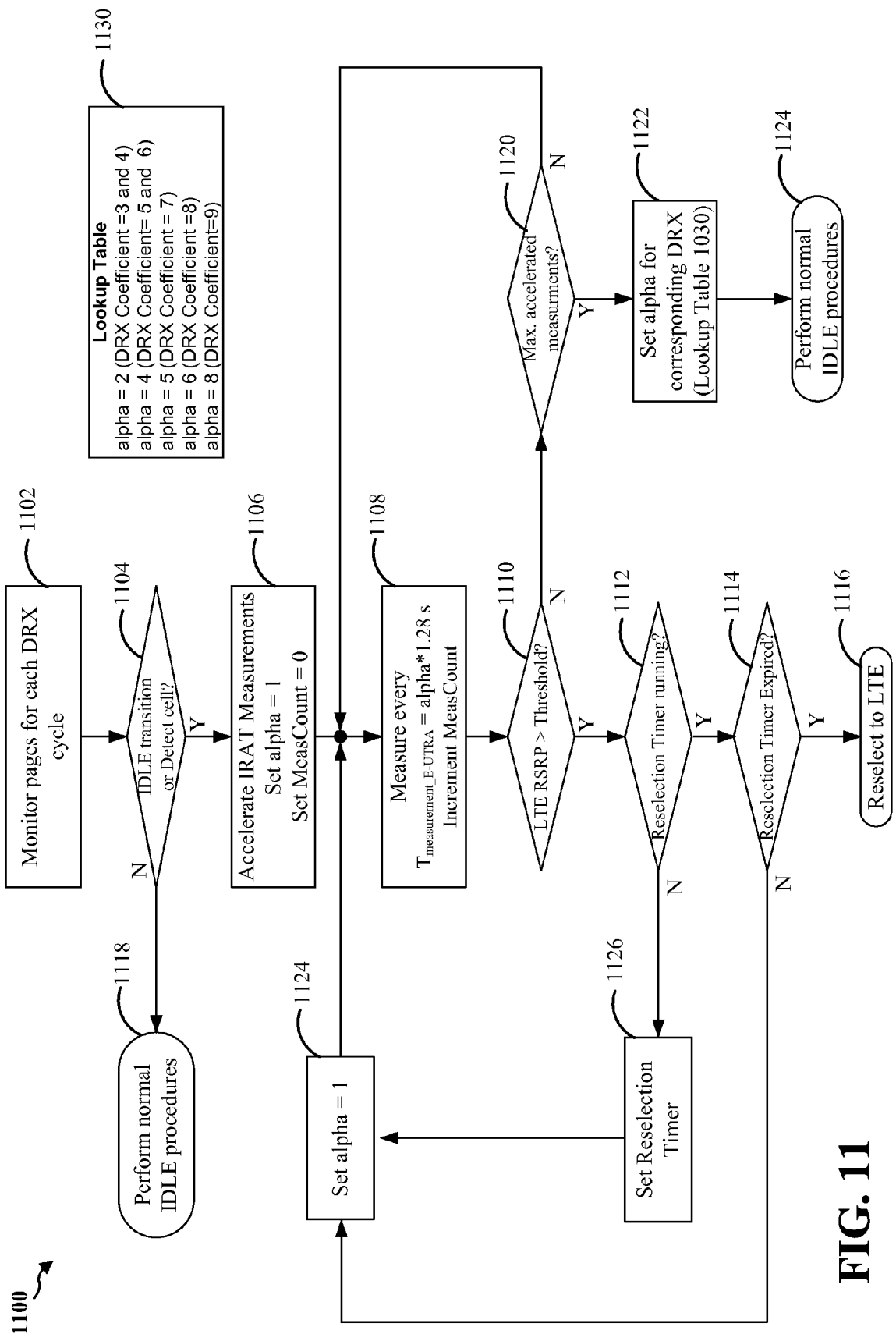
FIG. 11 illustrates detailed operations for measurement, in accordance with aspects of the present disclosure.

FIG. 11 illustrates an exemplary implementation of a method of wireless communication with varied rate of measurement, in accordance with aspects of the present disclosure. The method may be performed by a UE.

At 1102, the UE may monitor pages for every DRX cycle. Characteristics and attributes of the DRX cycle may be statically or semi-statically configured using, for example, one or more SIBs broadcast by a serving W-CDMA NodeB 204. These characteristics and attributes may be used to generate one or more lookup tables 1130 used by UE to manage page monitoring and IRAT measurement tasks. The UE may perform IRAT measurements while monitoring pages in certain DRX cycles.

At 1104, the UE determines if a transition event has occurred. The transition event typically results in the UE entering or remaining in an IDLE state of a lower-priority network. In one example, a plurality of transition events may be monitored, where the plurality of events comprise detection of a transition from DCH/Cell-FACH to an IDLE state, an LTE to W-CDMA IRAT reselection event, and detection of an LTE suitable cell. If no transition event is determined at 1104, the UE may commence or resume predefined conventional IDLE procedures. In one example, the UE determines whether a high-priority network is present when receiving service in a low-priority network. The high-priority network may employ a RAT that is different from the RAT employed by the low-priority network.

If a transition event was detected at 1104, then at 1106, the UE may autonomously accelerate IRAT measurements. The UE may selectively increase a rate of measurement of the high-priority network when presence of a high priority network is determined. The UE may increase the rate of IRAT measurement to an integer multiple of the DRX IRAT measurement rate. Using the product of an integer multiplier and the DRX frequency to obtain an increased rate of IRAT measurement may avoid the possibility that the UE missing pages when performing accelerated IRAT measurements. In some embodiments, the UE may initialize a measurement counter to track the number of measurements taken during accelerated IRAT measurement. The UE may also set a multiplier value, referred to herein as "alpha" to an initial value, which may be unitary in one example. The alpha multiplier is used to determine the measurement period during accelerated measurement. In one example, the DRX cycle has a period of 1.28 seconds and the accelerated measurement period is 1.28 (alpha). It will be appreciated that IRAT measurement rate is typically lower than the DRX cycle frequency. For example, a DRX coefficient may determine the number of DRX cycles per DRX measurement cycle. Thus, given Lookup Table 1130, measurement frequency is increased by a factor of between 3 and 9, when alpha=1 and the accelerated measurement period is determined by multiplying the DRX cycle period by alpha.

In some embodiments, accelerated measurements are taken at a rate of measurement that is increased to a predetermined maximum rate when the UE 206 is in the idle state (as in 1108 set to one measurement every 1.28 sec when alpha is set to 1). In some embodiments, accelerated measurement is initiated only if the UE 206 is in idle state. The maximum rate may be calculated as a product of an integer multiplier and a frequency of a DRX cycle defined for the low-priority network. The maximum rate may be calculated to provide one or more measurements during a DRX cycle in addition to a measurement triggered by the DRX cycle. The maximum Rate of measurements may also consider UE 206 processing capabilities.

If at step 1104, no transition event was detected, or at step 1120, the maximum number of accelerated measurements was performed, the UE 206 may return to normal or conventional IDLE procedures. In some embodiments, the rate of measurement is reduced by setting the rate of measurement to a minimum rate of measurement. The minimum rate of measurement may correspond to a DRX measurement period configured for a low-priority network. The rate of measurement may be reduced by reducing an integer multiplier when a current rate of measurement is greater than the frequency of the DRX cycle.

At step 1108, the UE measures the target network and increments the measurement counter. The UE may determine whether a service quality available in the high-priority network exceeds a threshold based on one or more measurements of the high-priority network. For example, the UE may evaluate one or more of RSRP, RSSI, and RSRQ against corresponding threshold values to determine if a suitable high-priority network is available. In certain embodiments, the UE evaluates service quality in the target high-priority network based on a predefined minimum number of measurements. The service quality in the high-priority network may be determined based on a plurality of measurements. One or more measurements may correspond to a measurement triggered by the DRX cycle.

If at 1110, the UE determines that a suitable high-priority network is available, the UE may determine if a reselection timer is running. The reselection timer may be set upon first identifying a target RAT. The reselection timer is used to determine if a certain minimum time $T_{reselection}$ has elapsed since first detection of the suitable high-priority network. In one example, $T_{reselection}$ may be predefined as two seconds. If no reselection timer is running, then the UE 206 may initialize the reselection timer at 1126, and UE may set the value of alpha to enable accelerated measurement at 1124, before returning to step 1108.

If a reselection timer is running, then the UE may determine at 1114 if the reselection timer has expired. If the reselection timer is not expired, then the UE may continue accelerated measurement by optionally setting the value of alpha at 1124 before returning to 1108. The value of alpha may be set at 1124 to accommodate embodiments that increase the accelerated measurement period gradually when the target RAT does not consistently meet threshold values. If the reselection timer is expired, then the UE may initiate the reselection of the higher priority network, which may be an LTE network, for example.

In some embodiments, switching to a high-priority network may be delayed until the UE has received service in the low-priority network for a predefined minimum period of time. Increasing a rate of measurement of the high-priority network may be conditioned on the UE receiving service in the low-priority network for a predefined minimum period of time. In some embodiments, the UE increases the rate of measurement when the UE transitions from an active state in the low-priority network to an idle state in the low priority network.

If at step 1110, the UE did not determine that a suitable high-priority network is available, the UE may determine at step 1120 if a maximum number of measurements has been performed, typically by evaluating measurement counter. If the maximum number of accelerated measurements has not been performed, then the UE may continue the accelerated measurements at step 1108.

If at step 1120, the UE determined that the maximum number of measurements has been performed, then the UE may reset alpha to resume the DRX configured rate of measurement and normal IDLE procedures may be resumed at step 1124. In some embodiments, the value of alpha may be increased incrementally until it is equivalent to the DRX equivalent value as provided by Lookup Table 1130.

Figure 12:
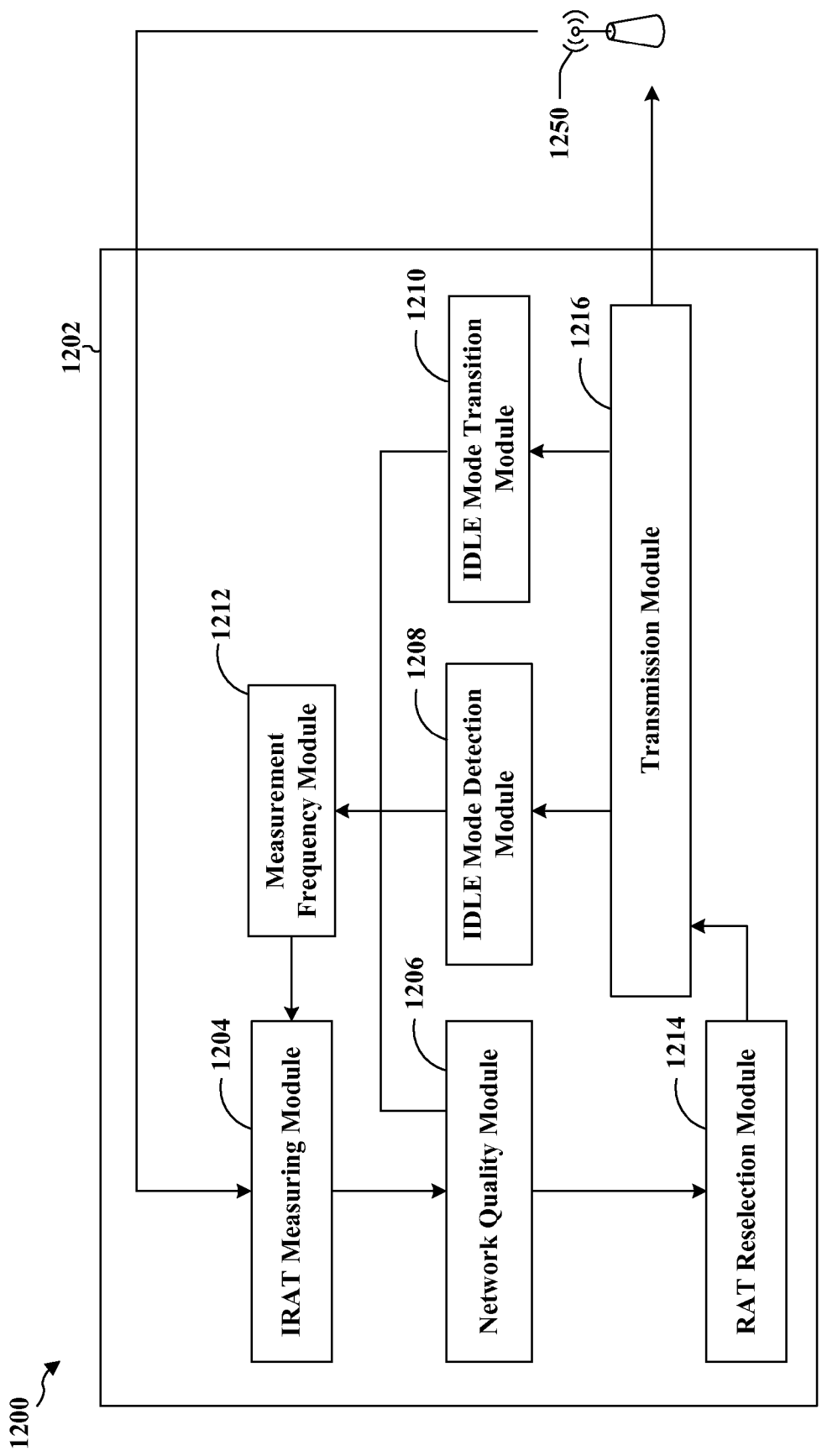
FIG. 12 illustrates conceptual data flow between different modules/means/components in an exemplary apparatus.

FIG. 12 is a conceptual data flow diagram 1200 illustrating the data flow between different modules/means/components in an exemplary apparatus 1202. The apparatus may be a UE 206. The apparatus includes a module 1204 that measures one or more quantities of a target network, a module 1206 that determines whether a high-priority network connection is available when the apparatus is connected to a low-priority network based on the measured quantities, a module 1208 that detects that the UE 206 is in IDLE state, a module 1210 that determines when the UE 206 transitions into IDLE state, a module 1212 that selectively increases a rate of measurement of the high-priority network connection when presence of the high-priority network connection is determined, a module 1214 that switches to the high-priority network when the service quality is determined to exceed the threshold, and a module 1216 that enables communication with networks employing different RATs.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
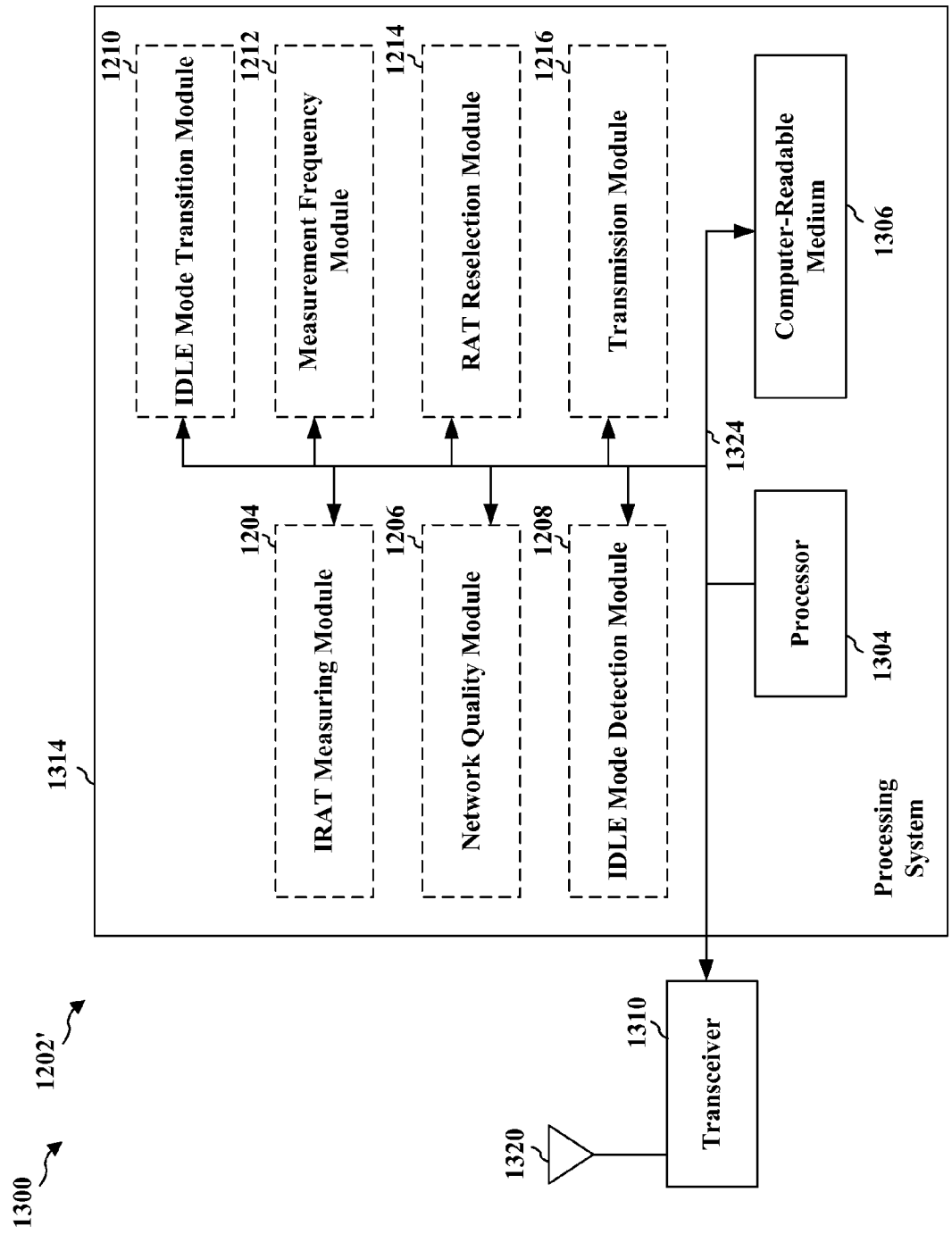
FIG. 13 illustrates an example of a hardware implementation for an apparatus employing a processing system.

FIG. 13 is a diagram illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, and 1216 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, 1214, and 1216. The modules may be software modules running in the processor 1304, resident/stored in the computer readable medium 1306, one or more hardware modules coupled to the processor 1304, or some combination thereof. The processing system 1314 may be a component of the UE 206 650 and may include the memory 660 and/or at least one of the TX processor 668, the RX processor 656, and the controller/processor 659.

In one configuration, the apparatus 1202/1202' for wireless communication includes means 1204 for measuring one or more quantities of a target network. Means 1204 may monitor pages for every DRX cycle. Characteristics and attributes of the DRX cycle may be statically, or semi-statically configured using, for example, one or more SIBs broadcast by a serving W-CDMA NodeB 204. These characteristics and attributes may be used to generate one or more lookup tables 1030 used by UE 206 to manage page monitoring and facilitate means 1204 to perform IRAT measurement tasks. Means 1204 may perform IRAT measurements while UE 206 monitors pages in certain DRX cycles In one configuration, the apparatus 1202/1202' for wireless communication includes means 1206 for determining whether a high-priority network connection is available when the apparatus is connected to a low-priority network based on the measured quantities. Means 1206 may determine whether a high-priority network is present when receiving service in a low-priority network. The high-priority network may employ a RAT that is different from the RAT employed by the low-priority network.

In one configuration, the apparatus 1202/1202' for wireless communication includes means 1208 for detecting that the UE 206 is in IDLE state. In one configuration, the apparatus 1202/1202' for wireless communication includes means 1210 for determining when the UE 206 transitions into IDLE state.

In one configuration, the apparatus 1202/1202' for wireless communication includes means 1212 for selectively increasing a rate of measurement of the high-priority network connection when presence of the high-priority network connection is determined. Means 1212 may selectively increase a rate of measurement of the high-priority network when presence of a high priority network is determined. Means 1212 may increase the rate of IRAT measurement to an integer multiple of the DRX IRAT measurement rate. Using the product of an integer multiplier and the DRX frequency to obtain an increased rate of IRAT measurement may avoid the possibility that the UE 206 missing pages when performing accelerated IRAT measurements. In some embodiments, means 1212 may initialize a measurement counter to track the number of measurements taken during accelerated IRAT measurement. Means 1212 may also set a multiplier value, referred to herein as "alpha" to an initial value, which may be unitary in one example. The alpha multiplier is used to determine the measurement period during accelerated measurement. In one example, the DRX cycle has a period of 1.28 seconds and the accelerated measurement period is 1.28 (alpha). It will be appreciated that IRAT measurement rate is typically lower than the DRX cycle frequency. For example, a DRX coefficient may determine the number of DRX cycles per DRX measurement cycle. Thus, given Lookup Table 1030, measurement frequency is increased by a factor of between 3 and 9, when alpha=1 and the accelerated measurement period is determined by multiplying the DRX cycle period by alpha. In some embodiments, accelerated measurements are taken at a rate of measurement that is increased to a predetermined maximum rate when the UE 206 is in the idle state. In some embodiments, accelerated measurement is initiated only if the UE 206 is in idle state. The maximum rate may be calculated as a product of an integer multiplier and a frequency of a DRX cycle defined for the low-priority network. The maximum rate may be calculated to provide one or more measurements during a DRX cycle in addition to a measurement triggered by the DRX cycle.

If no suitable high priority network is available means 1212 may reduce the rate of measurement by setting the rate of measurement to a minimum rate of measurement. The minimum rate of measurement may correspond to a frequency of a DRX cycle configured for a low-priority network. The rate of measurement may be reduced by reducing an integer multiplier when a current rate of measurement is greater than the frequency of the DRX cycle.

In one configuration, the apparatus 1202/1202' for wireless communication includes means 1214 for switching to the high-priority network when the service quality for a higher-priority RAT is determined to exceed the threshold. In one configuration, the apparatus 1202/1202' for wireless communication includes means 1216 for enabling communication with networks employing different RATs.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    while connected to a first radio access technology (RAT) network, entering a state in which measurements are performed in a second RAT network, wherein priorities of the first RAT network and the second RAT network are defined;
    selectively increasing a rate of measurements performed in the second RAT network when at least a first condition is met and when the second RAT network has a higher priority than the first RAT network, wherein increasing the rate of measurements in the second RAT network comprises setting the rate of measurements in the second RAT network to a predetermined maximum rate based on an integer multiple of a frequency of a discontinuous reception (DRX) cycle defined for the first RAT network; and
    selectively reducing the rate of measurements performed in the second RAT network when at least a second condition is met.

2. The method of claim 1, wherein reducing the rate of measurements performed in the second RAT network comprises setting the rate of measurements performed in the second RAT network to a minimum rate of measurement.

3. The method of claim 2, wherein the minimum rate of measurement corresponds to the frequency associated with the (DRX) cycle configured for the first RAT network.

4. The method of claim 2, wherein the minimum rate of measurement corresponds to the integer multiple of the frequency associated with the DRX cycle configured for the first RAT network.

5. The method of claim 1, wherein the state comprises an idle state.

6. The method of claim 1, wherein reducing the rate of measurements in the second RAT network comprises reducing the integer multiple.

7. The method of claim 1, wherein the second condition relates to a measured service quality in the second RAT network falling below a predefined threshold.

8. The method of claim 1, wherein a system information block transmitted in the first RAT network defines the frequency of the DRX cycle used to determine at least one of an increased or decreased rate of measurements in the second RAT network.

9. The method of claim 1, wherein at least one of the first condition and the second condition relates to at least one of a reference symbol received power, a carrier received signal strength indicator, or a reference signal received quality in the second RAT network exceeding a threshold value.

10. The method of claim 1, wherein at least one of the first condition and the second condition relates to battery power of the UE.

11. The method of claim 1, wherein at least one of the first condition and the second condition relates to a time of day.

12. The method of claim 1, wherein at least one of the first condition and the second condition relates to loading of at least one of the first RAT network and the second RAT network.

13. An apparatus for wireless communication by a user equipment (UE), comprising:
    means for entering a state in which measurements are performed in a second radio access technology (RAT) network while connected to a first RAT network, wherein priorities of the first RAT network and the second RAT network are defined;
    means for selectively increasing a rate of measurements performed in the second RAT network when at least a first condition is met and when the second RAT network has a higher priority than the first RAT network, wherein the means for selectively increasing the rate of measurements in the second RAT network comprises setting the rate of measurements in the second RAT network to a predetermined maximum rate based on an integer multiple of a frequency of a discontinuous reception (DRX) cycle defined for the first RAT network; and
    means for reducing the rate of measurements performed in the second RAT network when at least a second condition is met.

14. The apparatus of claim 13, wherein the means for reducing the rate of measurements performed in the second RAT network comprises means for setting the rate of measurements performed in the second RAT network to a minimum rate of measurement.

15. The apparatus of claim 14, wherein the minimum rate of measurement corresponds to the frequency associated with the (DRX) cycle configured for the first RAT network.

16. The apparatus of claim 14, wherein the minimum rate of measurement corresponds to the integer multiple of the frequency associated with the DRX cycle configured for the first RAT network.

17. The apparatus of claim 13, wherein the state comprises an idle state.

18. The apparatus of claim 13, wherein the means for reducing the rate of measurements in the second RAT network comprises means for reducing the integer multiple.

19. The apparatus of claim 13, wherein the second condition relates to a measured service quality in the second RAT network falling below a predefined threshold.

20. The apparatus of claim 13, wherein a system information block transmitted in the first RAT network defines the frequency of the DRX cycle used to determine at least one of an increased or decreased rate of measurements in the second RAT network.

21. The apparatus of claim 13, wherein at least one of the first condition and the second condition relates to at least one of a reference symbol received power, a carrier received signal strength indicator, or a reference signal received quality in the second RAT network exceeding a threshold value.

22. The apparatus of claim 13, wherein at least one of the first condition and the second condition relates to battery power of the UE.

23. The apparatus of claim 13, wherein at least one of the first condition and the second condition relates to a time of day.

24. The apparatus of claim 13, wherein at least one of the first condition and the second condition relates to loading of at least one of the first RAT network and the second RAT network.

25. An apparatus for wireless communication by a user equipment (UE), comprising:
    at least one processor configured to:
        enter a state in which measurements are performed in a second radio access technology (RAT) network while connected to a first RAT network, wherein priorities of the first RAT network and the second RAT network are defined;
        selectively increase a rate of measurements performed in the second RAT network when at least a first condition is met and when the second RAT network has a higher priority than the first RAT network, wherein the at least one processor is configured to increase the rate of measurements in the second RAT network comprises setting the rate of measurements in the second RAT network to a predetermined maximum rate based on a frequency of a discontinuous reception (DRX) cycle defined for the first RAT network; and
        selectively reduce the rate of measurements performed in the second RAT network when at least a second condition is met; and
    a memory coupled with the at least one processor.

26. The apparatus of claim 25, wherein the at least one processor is configured to reduce the rate of measurements performed in the second RAT network by setting the rate of measurements performed in the second RAT network to a minimum rate of measurement.

27. The apparatus of claim 26, wherein the minimum rate of measurement corresponds to the frequency associated with the (DRX) cycle configured for the first RAT network.

28. The apparatus of claim 26, wherein the minimum rate of measurement corresponds to the integer multiple of the frequency associated with the DRX cycle configured for the first RAT network.

29. The apparatus of claim 25, wherein the state comprises an idle state.

30. The apparatus of claim 25, wherein the at least one processor is configured to reduce the rate of measurements in the second RAT network by reducing the integer multiple.

31. The apparatus of claim 25, wherein the second condition relates to a measured service quality in the second RAT network falling below a predefined threshold.

32. The apparatus of claim 25, wherein a system information block transmitted in the first RAT network defines the frequency of the DRX cycle used to determine at least one of an increased or decreased rate of measurements in the second RAT network.

33. The apparatus of claim 25, wherein at least one of the first condition and the second condition relates to at least one of a reference symbol received power, a carrier received signal strength indicator, or a reference signal received quality in the second RAT network exceeding a threshold value.

34. The apparatus of claim 25, wherein at least one of the first condition and the second condition relates to battery power of the UE.

35. The apparatus of claim 25, wherein at least one of the first condition and the second condition relates to a time of day.

36. The apparatus of claim 25, wherein at least one of the first condition and the second condition relates to loading of at least one of the first RAT network and the second RAT network.

37. A non-transitory computer-readable medium for wireless communication by a user equipment (UE), the non-transitory computer-readable medium having instructions stored thereon, the instructions executable by one or more processors for:

while connected to a first radio access technology (RAT) network, entering a state in which measurements are performed in a second RAT network, wherein priorities of the first RAT network and the second RAT network are defined;

selectively increasing a rate of measurements performed in the second RAT network when at least a first condition is met and when the second RAT network has a higher priority than the first RAT network, wherein increasing the rate of measurements in the second RAT network comprises setting the rate of measurements in the second RAT network to a predetermined maximum rate based on a frequency of a discontinuous reception (DRX) cycle defined for the first RAT network; and selectively reducing the rate of measurements performed in the second RAT network when at least a second condition is met.

* * * * *